Jan. 12, 1971　　　D. A. I. GORING　　　3,554,825
SURFACE MODIFICATION OF CELLULOSE

Filed May 31, 1967　　　　　4 Sheets-Sheet 1

FIG. I

Inventor
David A. I. Goring
By Cushman, Darby & Cushman
Attorneys

VARIATION OF BOND STRENGTH AND TENSILE WITH TIME OF TREATMENT

United States Patent Office 3,554,825
Patented Jan. 12, 1971

3,554,825
SURFACE MODIFICATION OF CELLULOSE
David A. I. Goring, Montreal, Quebec, Canada, assignor to Pulp and Paper Research Institute of Canada, Pointe Claire, Quebec, Canada
Filed May 31, 1967, Ser. No. 642,544
Claims priority, application Great Britain, May 31, 1966, 24,291/66
Int. Cl. D21h *3/68;* D21j *3/12*
U.S. Cl. 156—76                 8 Claims

ABSTRACT OF THE DISCLOSURE

A process for bonding cellulose surfaces comprising oxidizing said surfaces by contacting said surfaces in a substantially dry state with ozone to thereby activate the surfaces for bonding and then pressing said surfaces in the presence of moisture into contact with each other and drying the pressed surfaces to effect bonding thereof.

---

This invention relates to an improvement in the bonding of cellulose surfaces to each other.

When cellulose fibres or surfaces are wetted, brought together and then dried, a bond is developed. This is believed to be due to hemicelluloses which differ from cellulose in having much lower molecular weight, in lacking crystalline structure, and in that hemicelluloses often have carboxylic groups which make them more hydrophobic than cellulose. Confirmation of the contribution of hemicelluloses is by the fact that pure celllulose will not bond strongly to itself.

This invention is based on the concept of treating the surface of cellulose so that cellulose molecules on or near the surface will be degraded and oxidized. Degradation will reduce the molecular weight to that approaching the hemicelluloses. Oxidation will introduce carboxylic groups. The degraded oxidized cellulose molecules on the surface will then behave like hemicellulose molecules in producing strong bonding when contacting surfaces are dried.

It is essential that the degradative reaction be confined only to the surface. This is particularly important in the case of paper making fibers. If the chemical reaction is allowed to penetrate deeply into the fiber, the fiber will become weak and not as useful for paper making. Thus a rapid heterogenous reaction between cellulose and a gas capable of degrading and oxidizing cellulose is the method by means of which the desired modification of the surface can be achieved.

Experiments have been carried out with model surfaces of regenerated cellulose. The reacting gas was ozone.

Strips of deacetylated cellulose acetate sheet were dried, placed in a laboratory ozoniser and treated for 15 minutes in a corona discharge in oxygen gas. The strips were then soaked in distilled water, pressed together crossed at 90° and then dried. The force required to rupture the strips in shear was measured. An approximately seven-fold increase in the bond strength was measured when corona-treated cellulose was compared with untreated strips. The tensile strength of the cellulose was virtually unaffected by the treatment.

The above experiment has been applied to thin strips of wood and also to strips cut from high basis weight handsheets made from sulphite pulp. In both of the above cases marked increase in the bond strength was produced by treatment in the corona.

It has also been discovered that a similar enhancement of bonding can be produced by treament with ozone gas outside of the corona provided that certain procedures are adopted. The specimen to be treated with ozone should be agitated in the gas stream during the treatment or other appropriate means should be used to ensure contact between the cellulose and the reagent gases. In addition, it is necessary to soak the ozone treated specimen in dilute alkali before making the bond. In this way bond strengths as high as those produced by corona treatment have been found. Treatment by ozone outside the corona without subsequent soaking in alkali produced an increase in bonding. Soaking in alkali without ozone treatment produced no marked increase in bonding. However, strong bonding was induced by treatment with a mixture of ozone and gaseous $NH_3$ outside the corona. Apparently the treatment with ammonia gas was an effective alternative to soaking in alkali.

It is advantageous to treat the cellulose with the activating gas when the cellulose is dry or only slightly moist to avoid degrading or weakening the bulk material.

In accordance with this invention there is provided a process for bonding cellulose surfaces comprising treating said surfaces with ozonized oxygen to activate the surfaces and, where such treatment with oxygen and ozone is outside the corona, treating said surfaces with a substance selected from the group consisting of ammonia gas and dilute aqueous alkali and then pressing said surfaces together in the presence of moisture and drying the pressed surfaces to develop a bond.

In the drawings which illustrate an apparatus for treating cellulose surfaces in accordance with this invention:

Figure 1:
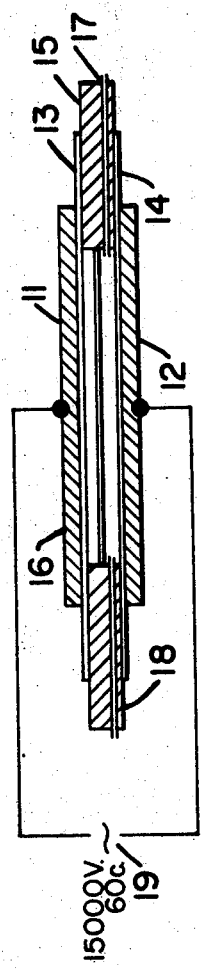
FIG. 1 is a diagram of an apparatus for treating a cellulose surface in a corona.

Referring now to FIG. 1, brass electrodes 11 and 12 are adjacent to dielectric sheets 13 and 14 of natural clear mica respectively and are separated by neoprene washer 15. Cellulose strip 16 which is to be treated is supported by washer 15. An inlet 17 for oxygen and an outlet 18 are provided in washer 15. The power supply 19 which is connected to electrodes 11 and 12 is a 15,000 volt neon lamp transformer.

Figure 2:
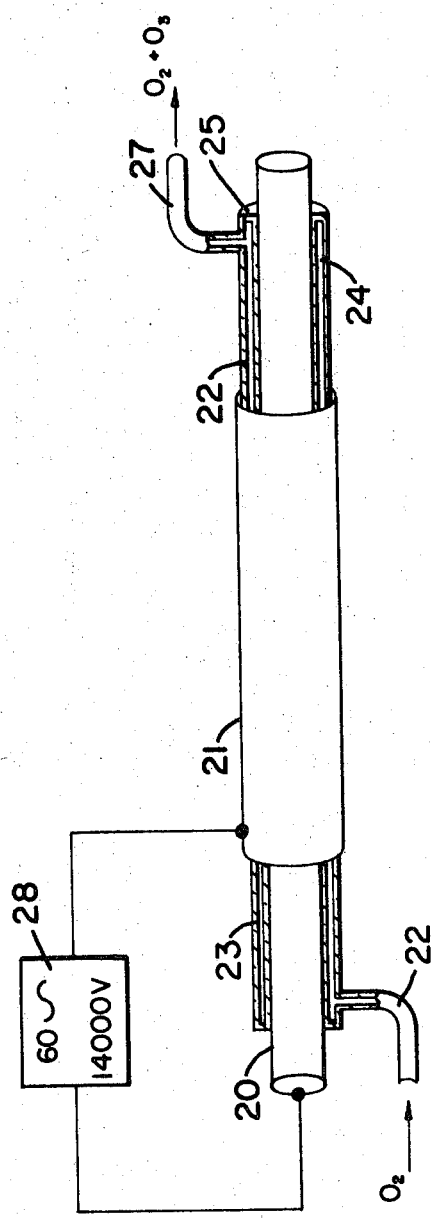
FIG. 2 is a diagram of an ozone generator.

In FIG. 2 there is illustrated a central electrode 20 around which there is an annular electrode 21. An annular gas chamber 22 is provided between electrodes 20 and 21 by concentric Pyrex tubes 23 and 24. The ends of tubes 23 and 24 are joined to provide a closed chamber as indicated at 25 and an inlet 26 is provided for oxygen together with an outlet 27 for the resultant mixture of oxygen and ozone. A power supply 28 is coupled to electrodes 20 and 21.

Figure 3:
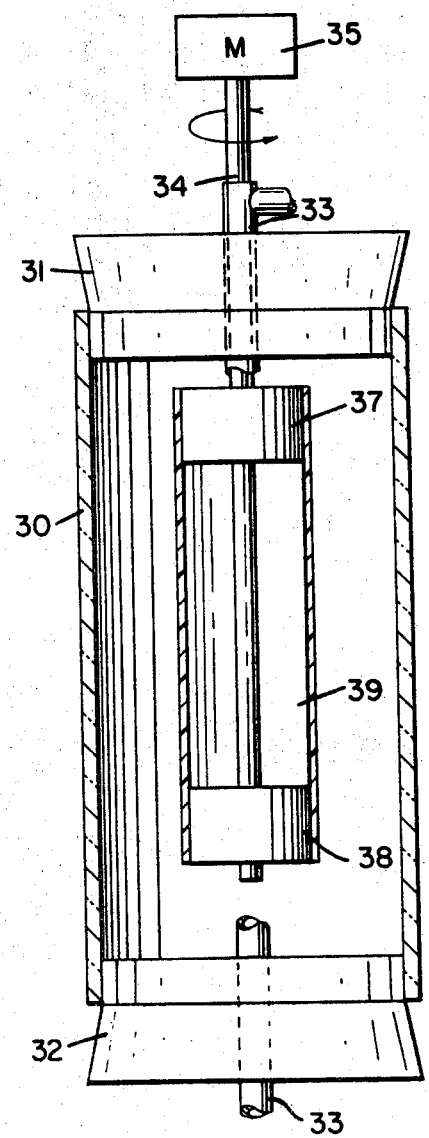
FIG. 3 is a diagram of an apparatus for use in conjunction with the ozone generator of FIG. 1 for treating a cellulose surface outside of the corona.

FIG. 3 illustrates the reactor comprising glass tube 30 having stoppers 31 and 32 inlet tube 33 passes through stopper 32 and is connected to outlet tube 27 of the ozone generator. A shaft 34 which is rotated by motor 35 passes through aperture 36 in stopper 31, plugs 37 and 38 are mounted on shaft 36 and support cellulose strip 39.

EXAMPLE I

Except where otherwise indicated the cellulose treated in accordance with this example was in the form of strips of cellulose made by deacetylation of a commercial secondary cellulose acetate sheet, 0.010″ in thickness. The sheet was cut into strips, 2 mm. in width. The strips were deacetylated by overnight soaking in a 50/50 mixture by volume of methanol and 2% aqueous NaOH. The deacetylated strips were soaked in 0.5% HCl and then thoroughly washed with distilled water. The strips were dried between a glass plate and fine stainless mesh. The cellulose strips were approximately 1.7 mm. wide when dry. They gave the usual X-ray diffraction of amorphous cellulose with no trace of the pattern for cellulose acetate.

Measurements were also made with 2 mm. strips cut from a handsheet of bleached sulphite pulp beaten to a CSF of 266. Standard pressing and drying procedues were used but the sheets were 4 times the usual basis weight (i.e. 4.8 g. per sheet).

Wood was also used as a test material. Strips of 2 mm. width were cut along the grain of a piece of birch veneer 0.020″ thick.

Ozonation was carried out in the flat plate corona apparatus shown in FIG. 1. The chamber was formed by sandwiching a ¼″ neoprene washer between two dielectric plates. The chamber was rectangular, 2.5″ x 8″. The electrodes were a pair of brass plates pressed to the dielectric plates on either side of the chamber. The electrodes were further insulated by a strip of neoprene rubber on their outer surfaces.

The cellulose strips were held mid-way between the dielectric plates as shown in FIG. 1. Gas was passed through the corona cavity by means of a narrow inlet and outlet. Most of the experiments described herein were done in dry oxygen at a flow rate of 1 ml./sec. Sometimes other gases were used as discussed below.

The power supply was a 15,000 v. neon lamp transformer. Glass, Teflon, Mylar, and other materials were tried as dielectrics. Breakdown and arcing usually occurred after rather short periods of application. The problem was solved by using sheets of natural clear mica, 0.030″ thick. These have given hundreds of hours of operation without failure.

After corona treatment, the strips were soaked in distilled water for an hour, cut into shorter pieces, placed on brass discs in the form of a cross and dried at 50° C. overnight under pressure. The bonded area was measured as the square area of apparent contact between the strips.

The dry, bonded specimens were then mounted in a clamp and the bond tested to rupture with a Chatillon Spring Tester. The tensile strength of the strip was measured in a similar fashion.

For any particular set of conditions it was usual to test at least six strips. When strong bonding was produced, the mean deviation between the six readings was about ±15%. This fell to ±5% when the mean values of several sets of six were compared. For very low bonding the mean deviation in six readings was ±50% which decreased to ±20% when the mean values of several sets of six were compared.

The bond strengths of strips treated for 15 minutes in the corona are shown in Table I. The controls were measured in the same manner except that the treatment in the corona apparatus was omitted. The results show clearly a marked increase in bond strength produced by the corona treatment. For the cellulose strips a sevenfold increase in bonding was found. A 25-fold increment was noted for the paper strips. The bonding effect in the case of wood was lower but still was significantly greater than for the controls. Strong bonding was also produced when cellophane was treated in the corona, the strip breaking before the bond.

TABLE I.—EFFECT OF CORONA TREATMENT ON BOND AND TENSILE STRENGTH

| Sample | Bond strength, kg. cm.$^{-2}$ | Tensile strength, kg. cm.$^{-2}$ |
|---|---|---|
| Cellulose: | | |
| Treated | 75 | 1,400 |
| Control | 11 | 1,500 |
| Handsheet: | | |
| Treated | 51 | 710 |
| Control | 2 | 750 |
| Birch Wood: | | |
| Treated | 16 | 850 |
| Control | 1 | 940 |

The tensile strength of the strips is included in Table I before and after corona treatment. A marginal decrease in tensile was produced by the treatment. Quite clearly, the corona treatment was altering only the surface of the specimen and was not producing excessive degradation in the bulk of the material.

Figure 4:
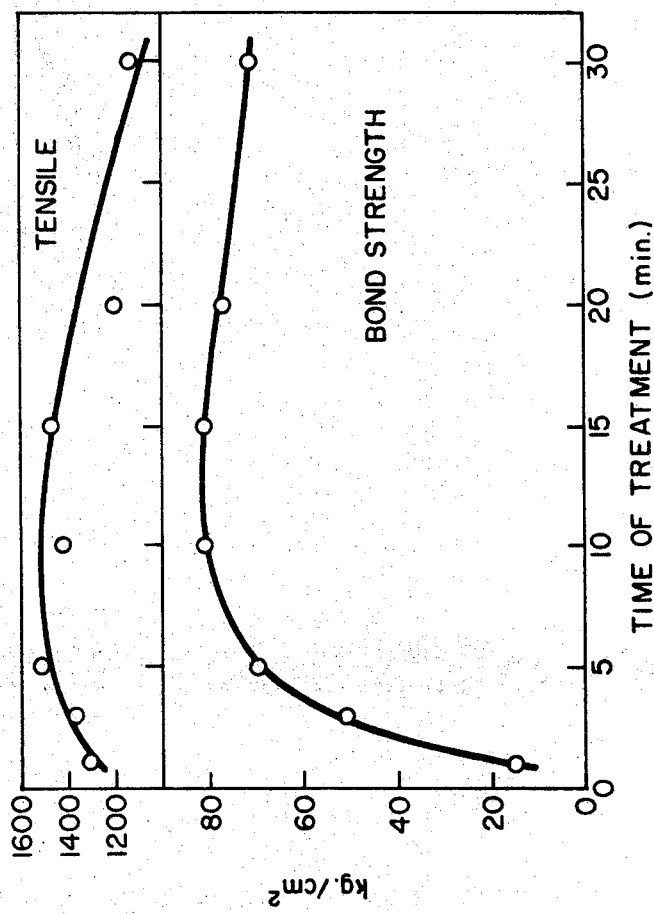
FIG. 4 is a plot of bond strength and tensile strength against time of treatment.

The effect of time of treatment is shown in FIG. 4. The bond strength rises rapidly in the first five minutes of treatment and then remains fairly constant. It is expected that the time required for effective surface activation would be much reduced by the use of a power source of higher frequency. The upper curve shows the small effect on the tensile strength of the strip.

The moisture content of the strip when undergoing corona treatment seemed to have little effect on the bond strength produced. This is shown in Table II for cellulose strips treated for 15 minutes at various moisture contents. The material dried under vacuum at 105° C. seemed to have a lower value of bond strength but for all the other samples the bond strength was about the same. The tensile strength was not markedly reduced by corona treatment at high moisture content.

TABLE II.—EFFECT OF MOISTURE CONTENT OF SAMPLE DURING CORONA TREATMENT ON BOND AND TENSILE STRENGTH

| Moisture content, percent | Bond strength, kg. cm.$^{-2}$ | Tensile strength, kg. cm.$^{-2}$ |
|---|---|---|
| Vacuum dried, 105° C | 45 | |
| Vacuum dried, 50° C | 76 | 1,300 |
| 6 | 76 | 1,200 |
| 11 | 66 | 1,200 |
| 19 | 71 | 1,300 |
| 21 | 82 | 1,200 |

Many experiments were then carried out in order to elucidate the nature of any chemical changes occurring on the surface. It was found that bonding was not produced when nitrogen was used in the corona in place of oxygen. However air could be used instead of oxygen with no perceptible diminution of the bonding produced. It therefore appeared that oxygen was necessary for the corona to be effective.

An infrared analysis showed that the cellulose was being oxidized in the corona. Cellophane treated for four hours, ground and pelletized in KBr gave a shoulder at 1720 cm.$^{-1}$ which was absent in the control. If the corona treated material was soaked in NaOH, the shoulder disappeared indicating the presence of —COOH groups. This result supported the premise that the ozone produced in the corona was oxidizing and degrading the cellulose and thereby increasing the bonding properties of the surface.

Microscopic examination of corona treated specimens shows a marked roughening of the surface of the cellulose. After bond breakage layers of cellulose appear to have been pulled out of the surface and this suggests that failure was occurring below the surface, the bond itself being stronger than the material of the strip.

EXAMPLE II

Ozone was generated in a laboratory ozonizer of conventional design as shown in FIG. 2. Oxygen gas was passed through the ⅛″ cylindrical annulus between two Pyrex glass tubes. The metal electrodes were inside the inner tube and outside the outer tube. The ozonizer was powered by a 60 w., 14,000 v. electrical supply. The rate of flow to the ozonizer was 250 ml. of oxygen gas per minute. The gas obtained from the ozonizer under these conditions contained about 15 mg./1 of ozone.

Two types of cellulose were used:

(1) A regenerated cellulose made by deacetylation of a 0.01″ sheet of secondary cellulose acetate by soaking overnight in a 50/50 mixture by volume of methanol and 2% aqueous NaOH.

(2) A hand sheet of bleached sulphite pulp beaten to a CSF of 266. Standard pressing and drying procedures were used in the preparation of the handsheet but the sheets were four times the usual basis weight. (i.e. 4.8 g. instead of 1.2 g. per sheet).

The cellulose sheet was cut into strips 2 mm. in width and 10 cm. long. The strips were then mounted in a reactor in which they were treated with the mixture of ozone and oxygen produced by the ozonizer.

A diagram of the reactor is shown in FIG. 3. The reacting gas was fed in to the bottom of the reactor. To ensure adequate mixing, the frame on which the strips were mounted was rotated at 1600 r.p.m. while the reaction took place. The gas escaped between the loose fitting stirrer shaft and the guide hole in the upper stopper. The reaction time was 15 minutes. The temperature was the ambient temperature of the room.

The ozone treated strips were removed from the reactor and soaked in a 0.5% solution of NaOH for 15 minutes.

Bond strength in shear rupture and the tensile strength of the strips were both measured as described earlier with a Chatillon Spring Tester.

Considerable increase in the adhesive properties was found when dry cellulose was treated with a mixture of ozone and ammonia gas and the alkali soaking was omitted.

The results obtained are compared with a control to which the above sequence was applied with the exception of the initial treatment with ozone and $NH_3$ gas. The data in Table III show a manifold increase in the bond strength for the ozone/$NH_3$ treated samples. Similar results were obtained when the sample was treated with ozone and $NH_3$ gas successively instead of with a mixture. This is shown in Table III also. In all of the above tests, the tensile strength of the cellulose was altered little by the treatment as shown in Table III.

TABLE III.—INCREASE IN BOND STRENGTH PRODUCED BY TREATMENT OF CELLULOSE WITH OZONE GAS

| Type of cellulose | Treatment | Bond strength, kg. cm.$^{-2}$ | Tensile strength, kg. cm.$^{-2}$ |
| --- | --- | --- | --- |
| Regenerated | Ozone treated and alkali soaked | 74 | 1,450 |
| Do | Treated with mixture of ozone and $NH_3$ | 78 | 1,310 |
| Do | Treated with ozone and $NH_3$ successively | 72 | 1,510 |
| Do | Control | 10 | 1,450 |
| Handsheet | Ozone treated and alkali soaked | 31 | 770 |
| Do | Treated with mixture of ozone and $NH_3$ | 54 | 690 |
| Do | Treated with ozone and $NH_3$ successively | 38 | 710 |
| Do | Control | 2 | 750 |

The experimental details for the production of ozone, treatment of the cellulose and testing the bond strength and the tensile strength were the same as in the case of the soaking in alkali with the following exceptions:

(1) For treatment with a mixture of ozone and $NH_3$, ammonia gas flowing at 250 ml./min. was combined with the gas from the ozonizer before being led into the reaction vessel.

(2) For successive treatment with ozone and $NH_3$, the flow rate of each gas was 250 ml./min.

(3) The alkali soaking after treatment was omitted and instead the treated strips were washed in water.

The results in Table III are all for strips of regenerated cellulose prepared by the deacetylation of sheets of cellulose acetate and for handsheets made of sulphite pulp. There is also evidence that the process is applicable to the treatment of pulp in the form of a fluff in order to increase the strength of the sheet of paper formed from the pulp.

Although the foregoing examples have illustrated the surface activation of cellulose strips, this process has potential for greatly increasing the bonding capacity of a papermaking fiber without decreasing the strength of the fiber. It could be applied to dry pulps before slushing, moist pulps and also to the sheet itself at various stages in the paper machine. It could also be used in any process requiring the bonding of sheets of cellulosic material, e.g., manufacture of plywood, hardboard or particle board.

Paper or board could be trated prior to lamination, pulp could be treated prior to sheet forming and the furnish of particle board could be treated prior to board formation.

I claim:

1. A process for bonding cellulose surfaces comprising oxidizing said surfaces by contacting said surfaces in a substantially dry state with ozone thereby to activate the surfaces for bonding and then pressing said surfaces in the presence of moisture into contact with each other and drying the pressed surfaces to effect bonding thereof.

2. A process as in claim 8 in which said surfaces are treated with a gas stream comprising ozone with agitation of said surfaces in relation to the gas stream.

3. A process as in claim 8 in which said surfaces are simultaneously treated with a mixture of ozonized oxygen and ammonia gas.

4. A process as in claim 1 in which the cellulose is a deacetylated cellulose acetate sheet.

5. A process as in claim 1 in which the cellulose is a sheet formed from sulphite pulp.

6. A process as in claim 8 in which the oxidized surfaces are soaked in a dilute solution of sodium hydroxide.

7. A process as claimed in claim 1 in which said surfaces are treated with ozone under corona discharge.

8. A process as claimed in claim 1 in which said surfaces are treated with ozone outside corona discharge and said surface is treated with ammonia or dilute aqueous alkali.

References Cited

UNITED STATES PATENTS

| | | | |
| --- | --- | --- | --- |
| 1,578,405 | 3/1926 | De Cew | 162—187X |
| 1,631,173 | 6/1927 | Weiss | 162—187X |
| 2,199,376 | 4/1940 | Reichert et al. | 162—71X |
| 2,923,964 | 2/1960 | Plonsley | 156—272X |
| 3,067,119 | 12/1962 | Ramaika | 156—272X |

CARL D. QUARFORTH, Primary Examiner

S. HELLMAN, Assistant Examiner

U.S. Cl. X.R.

8—116; 162—70, 187